United States Patent [19]

Lawson, Jr.

[11] 4,004,209

[45] Jan. 18, 1977

[54] WIDE RANGE POWER CONVERSION SYSTEM

[75] Inventor: Harry W. Lawson, Jr., Rush, N.Y.

[73] Assignee: Xerox Corporation, Stamford, Conn.

[22] Filed: Apr. 21, 1975

[21] Appl. No.: 570,524

[52] U.S. Cl. .................................. 321/2; 307/33; 321/25; 321/45 R; 323/9

[51] Int. Cl.[2] ........................................ H02M 7/155

[58] Field of Search ................ 307/12, 24, 32, 33, 307/35; 321/2, 11, 12, 25, 44, 45 R, 47; 323/6, 7, 9; 331/113 A

[56] References Cited

UNITED STATES PATENTS

| | | | |
|---|---|---|---|
| 3,248,639 | 4/1966 | Wellford | 331/113 A |
| 3,370,221 | 2/1968 | Plette et al. | 321/25 X |
| 3,417,348 | 12/1968 | Moore | 331/113 A |
| 3,461,405 | 8/1969 | Bishop et al. | 321/2 X |
| 3,660,751 | 5/1972 | Bullings | 321/2 |
| 3,758,840 | 9/1973 | Oliver | 321/2 |
| 3,806,792 | 4/1974 | Untamo | 321/25 |
| 3,818,308 | 6/1974 | Tamari | 321/2 X |
| 3,845,380 | 10/1974 | Lepp et al. | 323/7 |

*Primary Examiner*—A. D. Pellinen

[57] ABSTRACT

A wide range power conversion system which produces a highly regulated output over a wide range of variations in input AC source frequency and magnitude. A square full duty cycle voltage waveform is provided to current limiting means comprising a saturable-core reactor. The waveform has substantially constant volt-second characteristics, and the current produced by the waveform is controlled by the current limiter to provide a constant magnitude current to a load.

11 Claims, 7 Drawing Figures

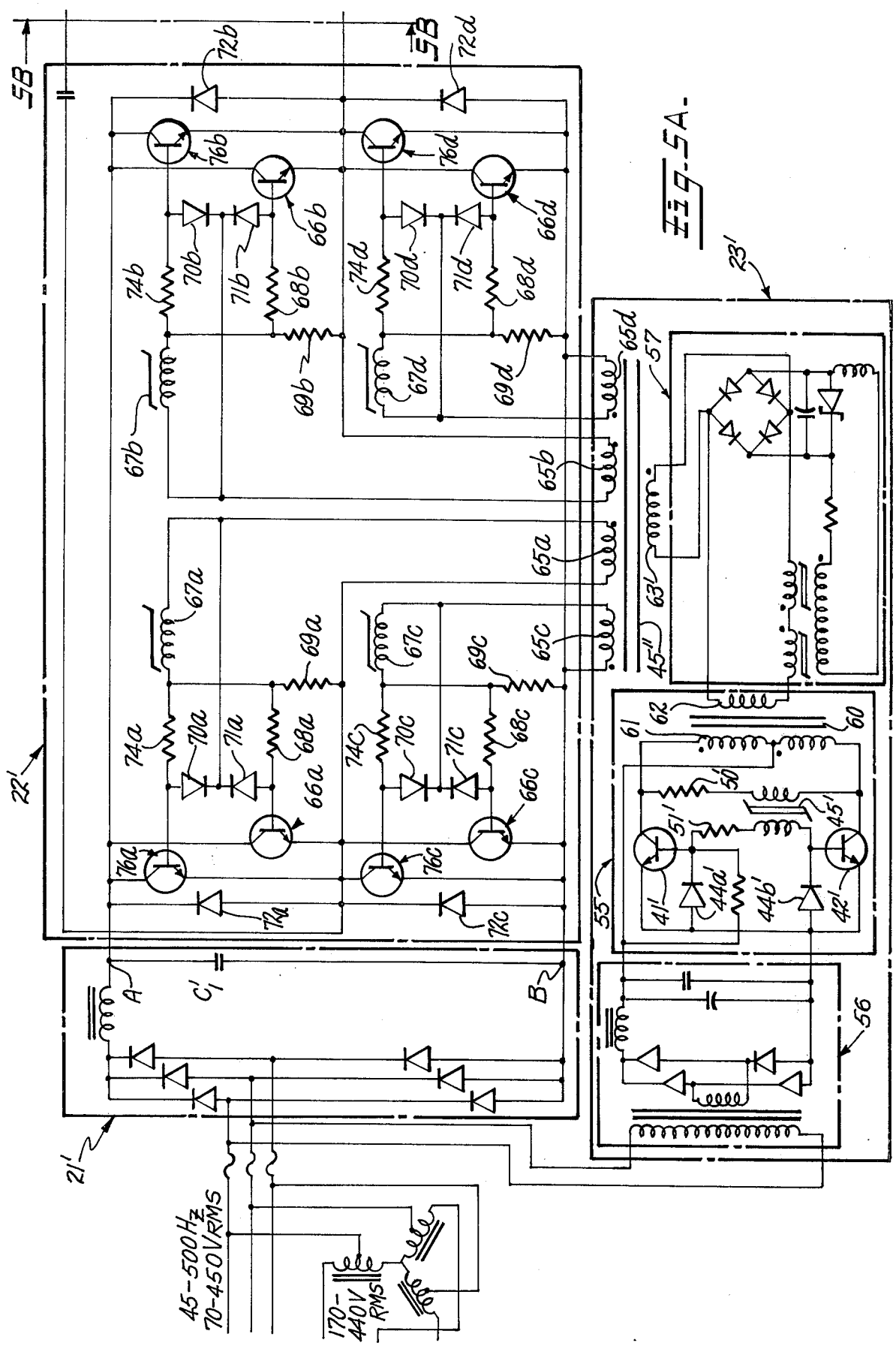

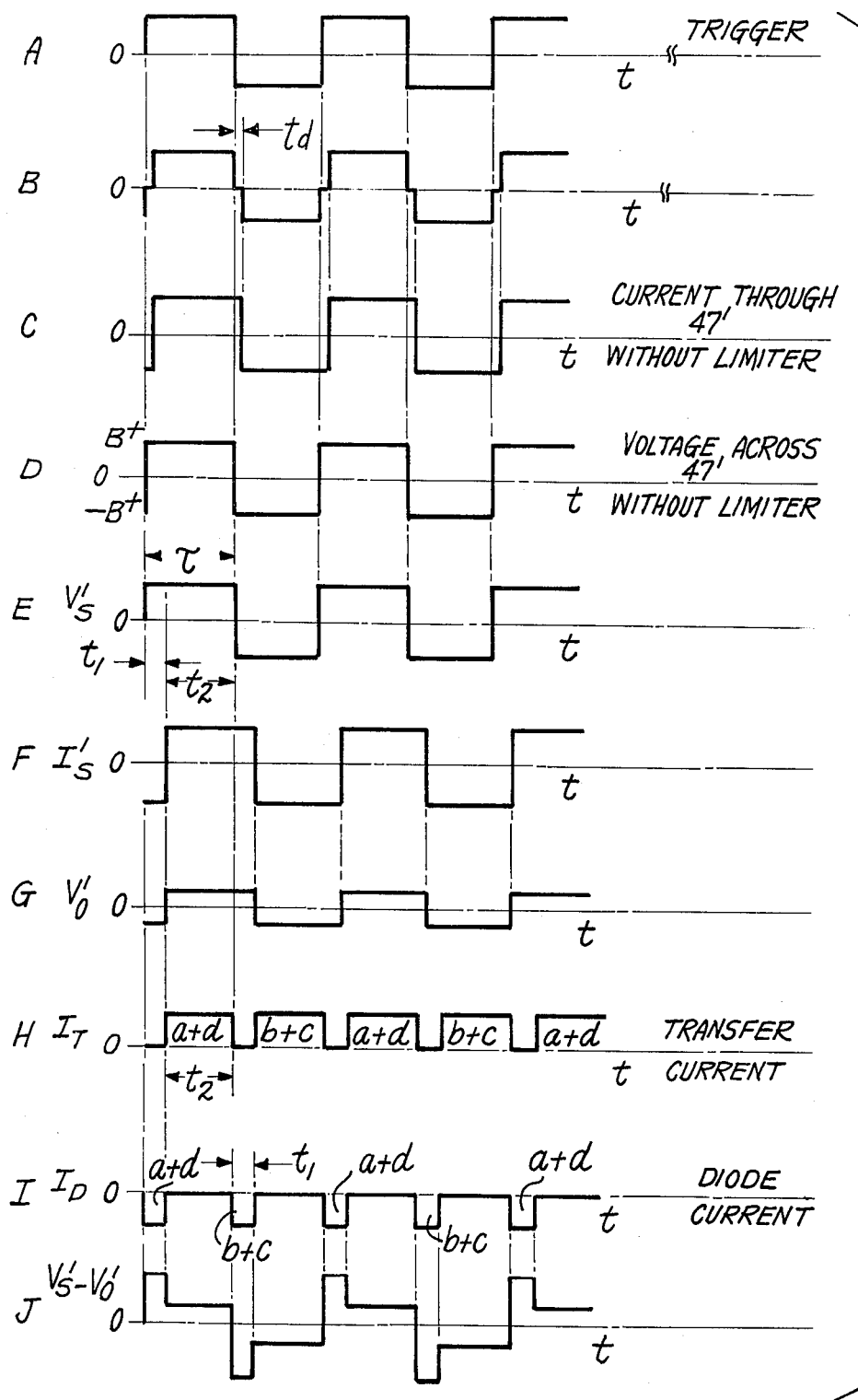

WIDE RANGE POWER CONVERSION SYSTEM

BACKGROUND OF THE INVENTION

1. Field of the Invention

This invention relates to the art of power supply voltage regulation, and particularly to conversion systems for providing constant current or voltage from an AC source which varies widely in magnitude and/or frequency.

2. Description of the Prior Art

It is known in the prior art to supply DC voltage and current to a load when only AC is available. It is also known to regulate the output of such supplies so that a variation in AC input magnitude will leave the output substantially unaltered.

The prior art, however, in the design of such power supplies generally achieves output regulation by use of various electronic input power dissipating devices such as vacuum tubes solid state devices, resistors and transformers. A typical approach samples the output magnitude and controls conductivity of variable impedance devices in response thereto, thus achieving stabilization. Feedback is used to control the gain of amplifiers, for example, whether AC or DC, and thus to regulate the output. Other devices employ various constant voltage or constant current devices across the output or in a feedback path to maintain regulation. Representative patents in the prior art include U.S. Pat. Nos. 3,697,854; 3,676,768; 3,219,906; 3,569,816; 3,219,907; 3,806,792 and 3,818,308.

Such prior art approaches often have a limitation on the allowable input voltage variation, to the order of ± 10-20%. In many instances, the design of the prior art circuit is dependent on the operating frequency and voltages of the input voltage source, so that at most, only minimal variations therein may be tolerated. For example, most supplies designed to function properly in a U.S.A. environment of 110 VAC at 60Hz will not function on a European current of 220 VAC at 50Hz.

In particular, when transformer means are employed for isolation purposes, the transformer is often designed to handle the unregulated input currents from the largest voltages which the input source may attain without saturation. In cases where wide variations of input voltage occur, e.g., 5:1 ratios, the transformer's large designed core size is largely wasted when the lower voltages are utilized. The same trade-offs of size and expense can occur when other inductive means are employed over a wide range of input voltages or frequencies. Thus, in forcing the design of inductive means to be dictated by the upper regions of voltages utilized to handle a maximum flux, large inefficiencies necessarily result during low voltage operations.

It thus becomes apparent that the prior art power supplies may be used in limited environments.

SUMMARY OF THE INVENTION

It is therefore an object of this invention to provide a new and improved power conversion system capable of producing a highly regulated, adjustable output current or voltage.

Another object of the invention is to provide a new and improved power supply capable of operating in environments of widely different input voltage magnitudes and frequencies.

Yet another object of the invention is to provide an inverter circuit coupled to current limiting means for producing a constant DC output to a load.

Another object of the invention is to provide a constant voltage-second square wave independent of input source voltages and frequencies for coupling to inductive reactor means for optimizing efficiency over a wide range of input voltage sources.

The power conversion system of the instant invention comprises an inverter or switching means for the input power to provide a generally constant volt-second output pulse train which is coupled to a current limiter. The constant volt-second waveform allows optimizing transformer and reactor components of the current limiter to achieve a generally constant predetermined and relatively low flux level for a wide range of input source voltages and frequencies. The current output of the current limiter is independent of the magnitude or frequency of the input sources and thus may provide constant DC current or voltage to a load. The power conversion system is particularly advantageous in providing a power supply means for machines such as xerographic photocopiers utilized in international markets where line voltages and frequencies vary from one nation to another.

BRIEF DESCRIPTION OF THE DRAWINGS

These and other objects of the invention will become clear in view of the following description wherein:

FIGS. 5A and 5B form a schematic circuit diagram of another embodiment of the invention as shown in block form in FIGS. 1-3; and FIG. 6 is a diagram of various waveforms useful in understanding the operation of the power conversion circuit of the instant invention.

DESCRIPTION OF THE PREFERRED EMBODIMENT

The novel features of the invention are set forth with particularity in the appended claims. The following description is meant as an aid in understanding the invention in conjunction with the accompanying drawings, and is not meant to limit the invention thereto.

Figure 1:
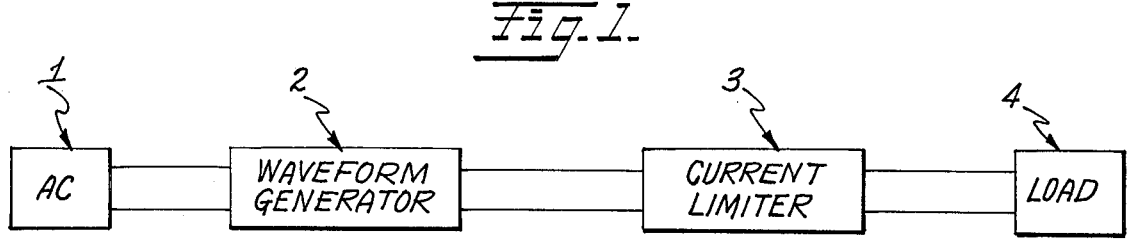
FIG. 1 is a block diagram of the power conversion system of the invention.

FIG. 1 illustrates a block diagram representing a typical embodiment of the invention comprising an AC source 1, wave form generator 2, current limiter 3 and load 4. The AC source 1 provides an AC voltage to the waveform generator 2 which produces a voltage with a waveform having certain fixed properties irrespective of changes in the applied AC source. The output of waveform generator 2 is fed to current limiter 3 which acts to limit the current flowing to load 4 to a constant value which is independent of variations in the AC source voltage and frequency.

Figure 2:
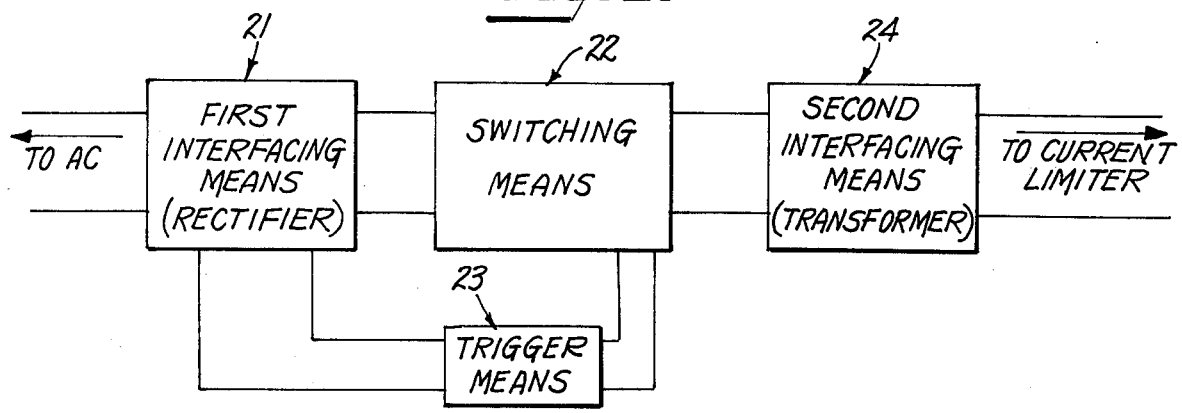
FIG. 2 is a block diagram of a waveform generator which is part of the instant invention.

FIG. 2 illustrates a functional block diagram of waveform generator 2 comprising a first interfacing means 21, inverting or switching means 22, trigger means 23 and second interfacing means 24. First interfacing means 21 may comprise a rectifier and filter network to supply the switching means 22 and trigger means 23 with appropriate operating voltages and currents. Switching means 22 may comprise a transistor switching bridge, for example, as described below in connection with FIG. 4, and trigger means 23 may comprise a magnetic multivibrator using saturable cores and having a frequency of oscillation approximately proportional to the magnitude of the input AC voltage.

The output of switching means 22 is fed to second interfacing means 24 which may comprise, for example, transformer means. The utilization of a transformer is generally desired to achieve isolation between input and output circuits.

Figure 3:
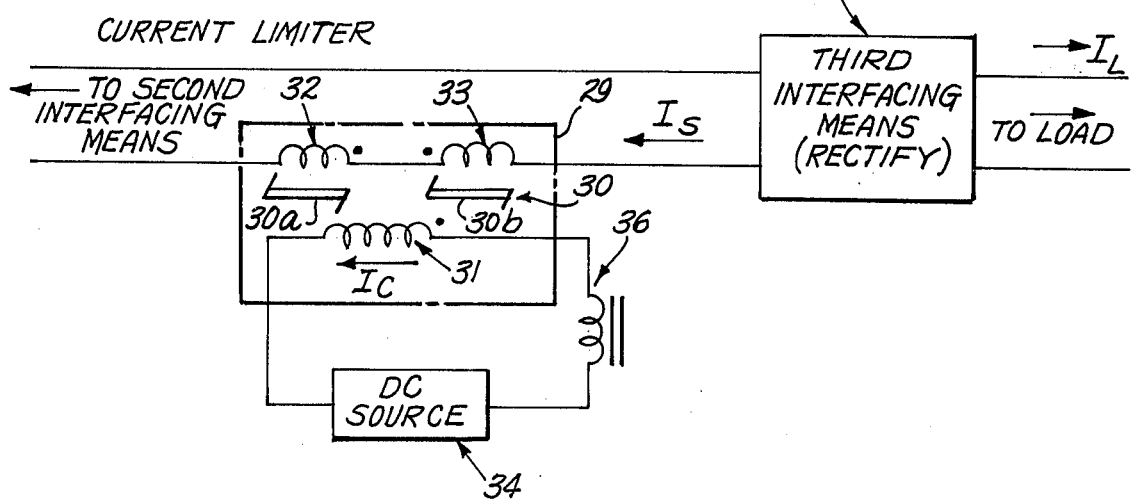
FIG. 3 is a block diagram of current limiting means which is a part of the instant invention.

FIG. 3 shows an exemplary embodiment of the current limiter 3 which comprises current limiting means 29 in the form of a saturable core transformer 30 having thereon a primary, on control winding 31 and two series connected and oppositely poled secondary windings 32 and 33 which serve to limit the current $I_S$ passing therethrough. Coils 32 and 33 are associated with separate saturable cores 30a and 30b, respectively. The controlled current $I_S$ passes through a third interfacing means 35 to provide load current $I_L$ to load 4. As explained below, $I_S$ is proportional to control current $I_C$. Control current $I_C$ is supplied from a DC source 34 through a choke coil 36.

Figure 4:
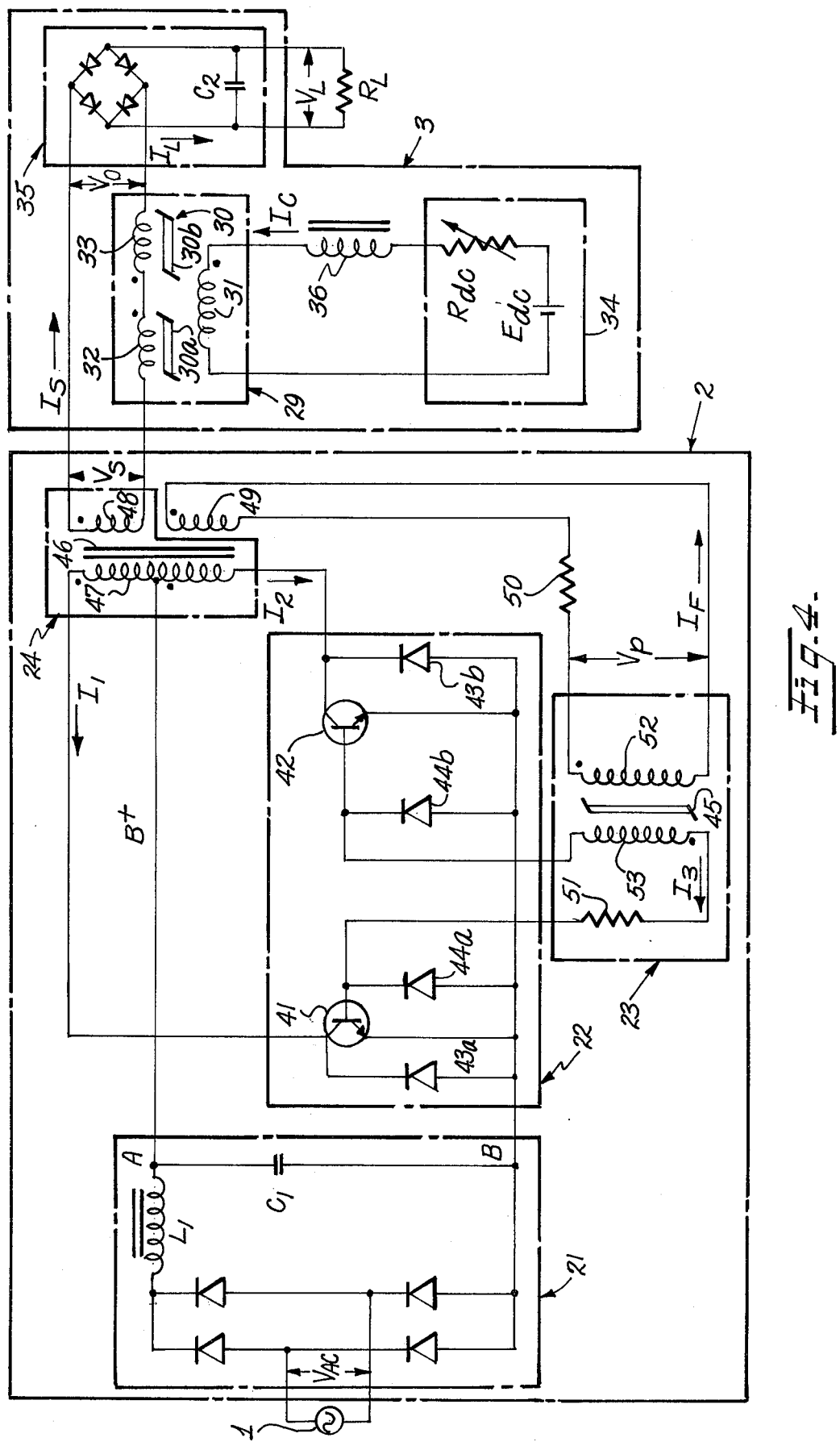
FIG. 4 is a schematic circuit diagram of an embodiment of the invention as shown in block form in FIGS. 1-3.

FIG. 4 is an illustration of one embodiment of the invention, showing the various circuit components and their interconnection. FIG. 4 combines specific embodiments of the various blocks shown in FIGS. 1–3. AC source 1 provides an output voltage to first interfacing means 21 of waveform generator 2. First interfacing means 21 comprises a full wave bridge rectifier whose output is filtered by choke $L_1$, and capacitor $C_1$. The resulting unregulated DC voltage, $B^+$, is applied to switching means 22 comprising transistors 41 and 42, shown for illustrative purposes as NPN type transistors. Diodes 43a and 43b are connected between the collector and emitter terminals of transistors 41 and 42, respectively, and poled so as to conduct current in a direction opposite to that of the transistors. Diodes 44a and 44b are connected across the base and emitter terminals of transistors 41 and 42, respectively, having an orientation such that a diode will conduct when the base-emitter junction of its respective transistor is cut off.

Second interfacing means 24 comprises a transformer 46 which has a center-tapped primary 47 for connection of the unregulated DC voltage, $B^+$, to transistors 41 and 42. The two end terminals of the center-tapped primary are connected to the collector terminals of transistors 41 and 42. The transformer 46 has a secondary winding 48 which is connected to current limiter 3.

The waveform generator 2 also has triggered means 23 which comprises a saturable core transformer 45 having a primary winding 52 and secondary or output winding 53. The input to primary winding 52 is obtained from a secondary feedback winding 49 of transformer 46 via a feedback resistor 50. Output winding 53 is in series with a resistance 51 and is connected between the bases of transistors 41 and 42.

The current limiter 3 is identical to that shown in FIG. 3. The variable DC source 34 comprises a battery $E_{dc}$ and variable resistance $R_{dc}$. The third interfacing means 35 comprises a full wave bridge rectifier and capacitor $C_2$. The output to load 4 is shown as a resistance $R_L$.

Winding polarities on the various coils are indicated by dots placed adjacent thereto and follow the conventional standards, like poled winding having the same sign voltages. In addition, currents in various circuit branches are indicated by an arrow adjacent the identifying symbol, e.g., $I_1$, $I_2$, $I_F$, etc. Whenever a current is referred to as positive, it is understood that the direction of current flow is that as shown by the corresponding arrow, whereas a negative value of current has a direction opposite to the corresponding arrow.

In operation, the circuit shown in FIG. 4 produces a constant direct current $I_L$ through load $R_L$, thus providing a fixed output voltage $V_o$, regardless of variations of the voltage magnitude or frequency of AC source 1. After rectification and filtering by first interfacing means 21, voltage $B^+$ is applied to the centertap of transformer 46. Because of circuit component differences, one of the two transistors 41 and 42 will conduct more heavily than the other. Assuming transistor 41 to be the more heavily conducting, it will be seen that, with $I_1 > I_2$, $I_F$ will be positive in feedback secondary 49, thus inducing a positive current $I_3$ in secondary winding 53 of transformer 45. The greater the difference $I_1-I_2$, the greater the current $I_3$. A larger base current $I_3$ causes transistor 41 to be more heavily conductive thereby increasing the imbalance in conductivity of the two transistors. Transistor 41 will thus quickly be driven into saturation with current $I_3$ flowing through the base circuit loop consisting of secondary winding 53, resistor 51, the base-emitter junction of transistor 41 and diode 44b. Transistor 22 will be driven into cut-off as its base will be negative with respect to its emitter. A transformer 45 approaches saturation, the voltage across primary winding 52 drops, thus reducing the voltage induced in secondary winding 53 and thereby reducing the magnitude of $I_3$. As $I_3$ decreases, transistor 41 will come out of saturation and conduct less heavily, thus reducing $I_1$. The reduction in $I_1$ will subsequently diminish $I_F$ thereby reducing $I_3$ still further. When $I_1$ drops below the cutoff current of transistor 42, the situation becomes one where $I_2 > I_1$, thus causing $I_F$ to be negative and similarly reversing the direction of flow of $I_3$. The negative current $I_3$ subsequently drives transistor 42 into saturation. Transistor 42 comes out of saturation when the core of transformer 45 again saturates. The circuit keeps oscillating at a rate determined by the characteristics of transformer 45 as well as the value of resistance 50. It is recognized that the circuit could also operate without the saturation of transistors 41 and 42, using, for example, sufficiently high values of resistor 51 to limit the maximum induced base current. The output of the above described waveform generation circuit is a square wave, which is applied to current limiter 3 through transformer 46. The peak value of the square wave is the same as the unregulated $B^+$ voltage from first interfacing means 21. The square wave is a full duty cycle square wave with its frequency proportional to the $B^+$ voltage magnitude. Essentially, the larger the amplitude of voltage $B^+$, the larger the induced voltage in secondary 49 of transformer 46 and the larger $dI_F/dt$. The greater $dI_F/dt$, the sooner the core of transformer 45 will saturate, thus switching the base current of transistors 41 and 42 at a faster rate.

When transistor 42 is on and $I_2$ is positive with $I_1 \simeq 0$, $I_s$ is positive. When transistor 41 is on and $I_1$ is positive, with $I_2 \simeq 0$, $I_s$ is negative. This square wave current $I_s$ flows through the two oppositely poled windings of saturable core transformer 30. With control current $I_c$ chosen to be a value which saturates the transformer's two cores, a current forced through the secondary windings will drive one core deeper into saturation while taking the other core out of its saturated state.

Thus, with $I_s$ positive, core 30a will be more deeply saturated while core 30b will be driven out of saturation. Assuming the number of turns on winding 31 to be N31, on winding 32 to be N32 and on winding 33 to be N33, it is seen that $I_s$ will thus be limited to the value $$I_s = \frac{N31}{N33} I_c \qquad (1)$$

during the period of time when transistor 42 is on, and to $$I_s = \frac{-N31}{N32} I_c \qquad (2)$$

during the time that transistor 41 is on. Assuming a design wherein N32 = N33, it becomes evident that $|I_s|$ is proportional to $I_c$ at all times. A constant $I_c$ will thus provide a constant square wave amplitude $I_s$.

Third interfacing means 35 comprises full wave bridge rectifier and filter capacitor $C_2$. The output of interfacing means 35 is a constant DC current, $I_L$, equal in magnitude to $I_s$ and thus directly proportional to $I_c$. For a constant load resistance, $I_L$ produces a constant load voltage $V_L$. If the load varies, a constant current is maintained by maintaining $I_c$ constant. Where a constant output voltage is desired, $I_c$ may be varied as the load is changed to produce the desired constant voltage. Choke 36 is included in the control circuit of current limiter 3 to eliminate reflections of the variations in $I_s$ from affecting $I_c$. The circuit will function as a constant current output $I_L$ whenever $$\frac{B^+}{R_L} \frac{(N48)^2}{(N47)^2}$$

exceeds the required load current $I_L$, where $$\frac{N47}{N48}$$

is the turns ratio from one half of the center-tapped primary to the secondary winding of transformer 46.

Since voltage $B^+$ is directly proportional to the magnitude of the AC source voltage, it follows that use of a current limiter of the type shown can effect a fixed output voltage for any magnitude input voltage.

Transformer 46 limits the actual permissible variation in input voltage, however, by the number of turns found thereon, their diameter, the selection and design of the core, etc. These factors limit the transformer's flux handling capability. Similar factors limit the flux handling capability of saturable cores 32 and 33. In selecting any reactive type device, one is traditionally led to utilize a device capable of handling the flux produced by the highest voltage utilized. For input voltage variations on the order of 3:1, for example, this constraint dictates a large, bulky and expensive transformer 46 and current limiting means 29. In such circumstances, the utilization of large flux handling devices with low input voltages results in considerable waste of core materials. Space and cost requirements alone would dictate the utilization of reactive devices designed for low voltage uses. One advantage of the instant invention is the ability to utilize a transformer selected for the low voltage range of the AC sources employed while maintaining the required flux levels by reducing the period of the generated square wave at the output of transformer 46. In effect, one produces a full duty cycle constant volt-second square wave at transformer 46. An increase in source voltage then produces a corresponding decrease in square-wave pulse period so that the maximum flux level is fixed and may thus be set for the low voltage ranges employed. The constant volt-second square wave then allows optimum selections of both transformer 46 is well as current limiting means 29.

Assuming, for illustrative purposes, that N47 = N48 = N, the voltage $V_s$ at the output of transformer 46 (secondary winding 48) is given by $$V_s = N \frac{d\phi}{dt} \qquad (3)$$

Thus, the flux change through coil 48 is $$\phi = \frac{1}{N} \int_{t_1}^{t_2} V_s \, dt. \qquad (4)$$

It is seen that a constant flux is obtainable if the voltage increases are accompanied by proportional decreases in period.

More specifically the nearly constant volt-second output $V_s$ of transformer 46 is achieved by utilizing the saturable core 45 of the trigger means 23 to appropriately trigger transistors 41 and 42. The voltage induced in primary coil 52 of transformer 45 is directly proportional to the unregulated $B^+$ voltage which is in turn proportional to the magnitude of the AC source voltage $V_{ac}$. The greater the voltage across the primary of transformer 45, the earlier it will saturate, as its operation is governed by the relation, $$V_p = N52 \frac{d\phi_p}{dt} \alpha \frac{dIF}{dt} \qquad (5)$$

Where $V_p$ and $\phi_p$ and the voltage and flux respectively associated with primary winding 52 having N52 turns. It follows that as $V_p$ increases, so does $$\frac{d\phi_p}{dt}.$$

thus leading to saturation in a length of time T inversely proportional to the magnitude of $V_p$. It is precisely this time T, however, which constitutes the half-period of the generated square wave through transformer 46. Thus, for a square wave of amplitude $V_s$ and period 2T, the flux $\phi_s$ through 48 is $$\phi_s \max = \frac{V_s}{N} T. \qquad (6)$$

It has already been shown that $V_s$ is proportional to $V_{ac}$, or $$V_s = K_1 V_{ac} \qquad (7)$$

where $K_1$ is a conventional constant for the proportionality between the A.C. line voltage magnitude and the inverter D.C. supply voltage magnitude, i.e., the rectification conversion.

Use of a trigger circuit whose frequency is proportional the magnitude $V_{ac}$ provides:

$$T = \frac{1}{K_2 V_{ac}} \quad (8)$$

where $K_2$ is the designed constant by which the trigger circuit's frequency is proportioned to the magnitude of $V_{ac}$.

Thus, from (6), (7) and (8), it follows that in the circuit shown:

$$\phi_n \max = \frac{K_1}{NK_2} \quad (9)$$

That is, the maximum flux change required to be handled by the transformer is a constant, independent of variations in source voltage magnitude $V_{ac}$.

Figure 5B:
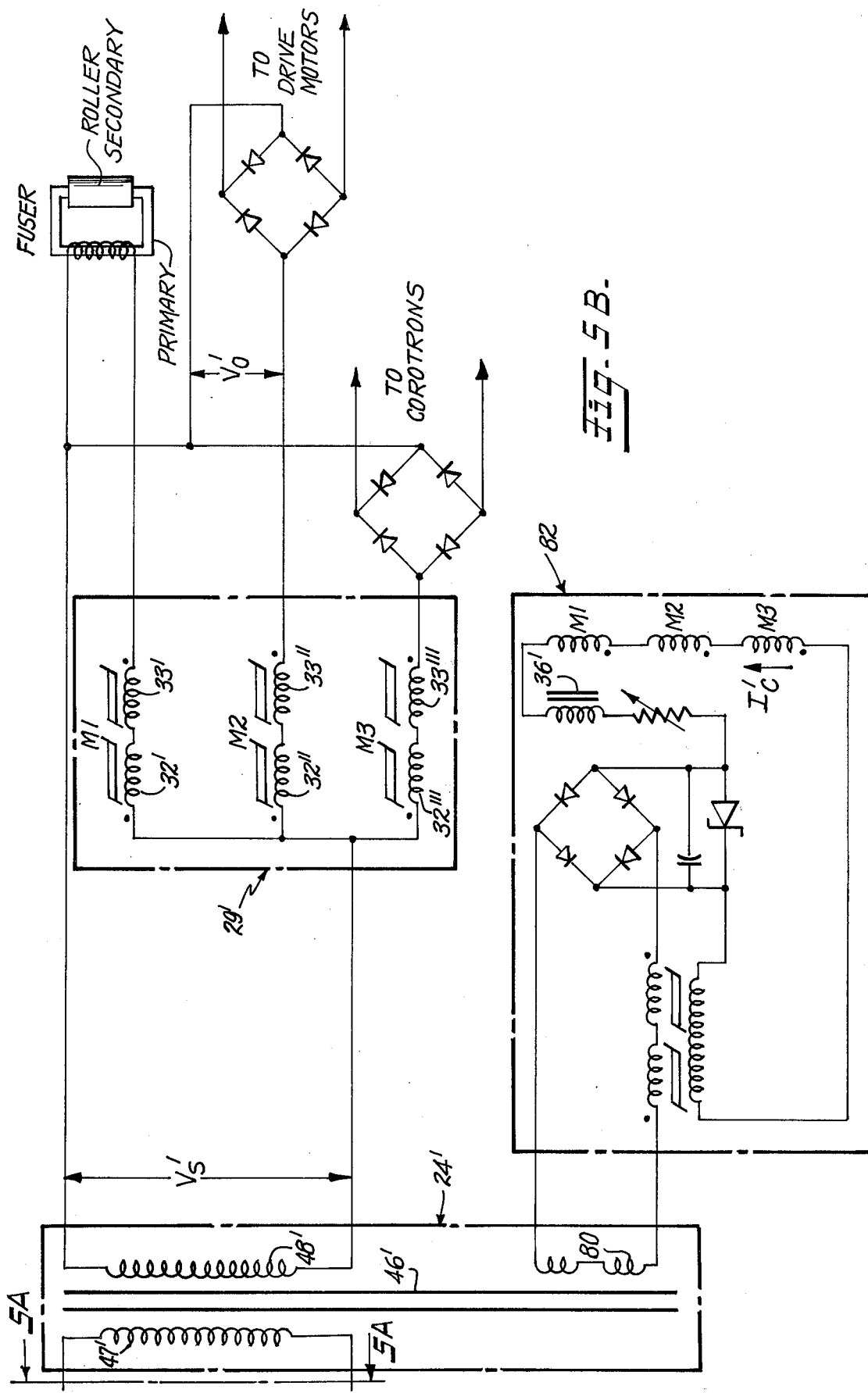

FIGS. 5A and 5B show an alternate embodiment of the invention, which, for the sake of illustration, is described as utilized in conjunction with a photocopy machine operative in many different nations having different line voltage and frequencies. For example, the Power Conversion System of the instant invention is shown adopted to receive single phase AC ranging from 45–500 Hz and 70–470 volts (RMS) and three phase AC, 170–440 volt (RMS) line-to-line. For use in international markets, only appropriate plug means need to be connected to the Power Conversion System as the circuit will automatically convert all of the specified ranges of input voltages and currents into the predetermined current levels required to operate various elements of the photocopy machine, e.g., drive motor, fuser, corotron etc.

It will be recognized that the elements of the circuit shown in FIGS. 5A–5B and their operation are analogous to the elements and operation of FIG. 4. In this regard, primed members are utilized in FIGS. 5A–5B to identify corresponding circuit elements to those of FIG. 4. Specifically, first interfacing means 21' provides rectification and filtering of the AC source voltage. The switching means 22' is now shown as an eight transistor bridge network driven by trigger means 23'. Instead of trigger means 23' being coupled to the transformer 46 of second interfacing means 24 as in FIG. 4, trigger means 23' comprises magnetic oscillator means 55 receiving DC voltage from trigger rectifier and filtering means 56, and supplying a constant voltage to transformer 45'' via trigger current limiting means 57. Magnetic oscillator means 55 comprises transistors 41' and 42', in circuit with diodes 44a' and 44b', respectively, along with resistors 50' and 51' and saturable core 45'. These elements all perform the same functions as their unprimed counterparts in FIG. 4, namely, generation of a square wave. The square wave is coupled to the trigger current limiting means 57 via transformer 60 having center tapped primary winding 61 and secondary winding 62. The trigger current limiting means 57 is similar in operation to the current limiting means 29 of FIG. 4, although in FIG. 5A a DC feedback bridge and zener diode are employed. The current limited square wave output of secondary winding 62 is fed to primary 63' of transformer 45''. Transformer 45'' is labeled as such since it functionally is the counterpart of transformer 45 (FIG. 4) in that it serves to interconnect the square wave triggering waveform to the bases of the transistor switching network. In contrast, saturable transformer 45' of magnetic oscillator 55 serves to define the frequency of oscillation of the generated square wave and, in this respect, is likewise analogous to the saturable transformer 45 of FIG. 4.

The magnetic oscillator 55 is designed to oscillate between 20KHz and 55KHz in proportion to the magnitude of the AS source voltage. This frequency range takes advantage of high efficiency core materials and their relative cost and size advantages while avoiding any audible noise problems which exist in the lower frequency region, e.g., 10KHz.

Switching means 22' comprises a first group of four transistors 66a–66d shown connected in parallel to a second group of transistors 76a–76d respectively and having their base drives isolated from each other via diodes 70a–70d and 71a–71d. The utilization of the second group of transistors connected in parallel (or alternately Darlington connected) serves to increase the current handling capability of the bridge network but is not essential to the operation thereof.

Trigger means 23' is coupled to switching means 22' by secondary coils 65a–65d of transformer 45''. Each of the transistors 66a–66d and 76a–76d are triggered on and off by the output of secondary windings 65a–65d, respectively. The trigger pulses from windings 65a–65d are coupled to the bases of the transistors 66a–66d through saturable cores 67a–67d, and voltage divider network comprising resistors 68a, 69a through 68d, 69d. In a similar fashion, the trigger pulses are coupled to the bases of transistors 76a–76d through saturable cores 67a–67d and resistors 74a–74d, respectively.

Operation of the transistor bridge is described briefly below. For simplicity of description, one may ignore for the moment the operation of transistor 76a–76d as these transistors turn on and off together with their associated transistors 66a–66d. At any given time, transistors 66a and 66d will be on (off) and transistors 66b and 66c will be off (on). As such, the current path will, in one case, be from terminal A at the output of the first interfacing means 21' through the collector-emitter of transistor 66a, down through the primary 47' of transformer 46', through the collector-emitter of transistor 66d and to terminal B of the first interfacing means 21'. For this case, the trigger current path is from the positive output (using standard dot convertion) of secondary 65a through saturable core 67a, resistor 68a, the base-emitter of transistor 66a and to the negative side of secondary 65a. A similar trigger current path exist for transistor 66d. In the second case, with transistors 66a and 66d off and transistors 66b and 66c on, the current path is from terminal A through the collector-emitter of transistor 66b, up through the primary 47' of transformer 46', through the collector-emitter of transistor 66c to terminal B. The trigger pulses current paths through the base-emitters of transistors 66b and 66c are similar to that described above with respect to the base-emitter trigger current path of transistor 66a.

Saturable cores 67a–67d are used to introduce a delay in the turn-on time of the associated transistors 67a–67d (as well as 76a–76d) with respect to the leading edge of the symmetrical, square triggering pulse. This delay insures that terminals A and B are not short circuited because of the inherent storage time of transistors. Transistors, because of their finite storage time inherently take longer to turn-off than to turn-on. Thus, if transistor 66a is not fully off before transistor 66c is turned on, a short would exist between terminals A and B. Curve A of FIG. 6 shows the triggering pulse applied from the secondary coils 65a–65d. Curve B shows the current (voltage) pulses that result at the primary 47' of transformer 46' with the use of saturable cores 67a–67d. It is noted that the turn-on time of any given transistor is delayed by a time, $t_d$, (on the order of micro-seconds) in relation to the leading edge of the triggering pulse. However, since the trailing edge of the triggering pulse of curve A is coupled through diodes 71a–71d, the turn-off of each transistor 66a–66d is in phase with the trailing edge of the triggering pulse. (Diodes 70a–70d couple the triggering pulse trailing edge to transistors 76a–76d). Symmetrical square waves used in transistor inverting bridge circuits are discussed in the prior art as, for example, in the Tamari U.S. Pat. No. 3,818,308.

In as much as second interfacing means 24' comprises inductive means (transformer 46'), abrupt changes in current lead to high reverse voltages across the two transistors (transistors 66a and 66d or transistor 66b and 66c), which are next scheduled to turn on, and high forward voltages across the two transistors scheduled to be turned off. The incorporation of diodes 72a–72d tend to maintain a current flow in the primary 47' during the transistion period and effectively serve to input power to the source (capacitor $C_1'$) and prevent the large reverse and forward voltages to transistors. Curves C and D illustrate the current and voltage waveforms to primary 47' using the saturable cores 67a–67d as well as the diodes 72a–72d. These waveforms are changed however when the transformer 46' is used with the current limiter as explained below.

Current limiting means 29' comprises a plurality of parallel-connected pairs of oppositely poled saturable reactors which are alternately driven into and out of saturation in a similar fashion as cores 30a and 30b of FIG. 4. Each pair of reactors in conjunction with the approximately constant voltage-second waveform at secondary 48' supplies a constant current to a given load. For example, reactors 32' and 33' may be used to drive an induction fuser heater similar to the heated roller disclosed in Lusebrink U.S. Pat. No. 3,201,558. In such heating systems, the current is fed to a primary coil and a metallic roller serves as a secondary coil heated by induction. Reactors 32" and 33" are shown connected to a rectifying bridge and may subsequently be used to supply power to drive motors of the photocopy machine. Additional parallel connected reactors such as reactors 32''' and 33''' may be connected to rectifiers, and the rectified output used to supply power to the corotrons of a xerographic photocopy machine. Obviously, other elements of a photocopy machine may be supplied in a similar fashion.

The control current to the current limiting means 29' is supplied from a secondary coil 80 of transformer 46' and a current generator 82. The current generator 82 is constructed in a similar fashion as trigger current limiting means 57 and utilizes a zener diode for voltage regulation. Choke coil 36' stores energy from the current limiting means 29' and serves to prevent induced currents from affecting the control current $I_c'$.

FIG. 6 illustrates a voltage curve E which represents the voltage $V_s'$ across secondary 48' and a curve F representing the current $I_s'$ from the coil 48' through one of the three limiters M1 or M2 or M3 of FIG. 5B. (Curves E and F also represent the voltage and current at the primary coil 47'.) Assuming for the sake of illustration that only a single pair of reactors 32" and 33" are utilized, the current $I_s'$ also goes through these reactors, is subsequently rectified and fed to a load, e.g., drive motors. The current $I_s'$ will be delayed relative to the voltage $V_s'$ by an amount $t_1$ which depends upon the amount by which the voltage $V_s'$ exceeds the load voltage $V_o'$. The load voltage curve is shown by curve G in FIG. 6. One may write $$(V_s' - V_o')t_1 = (V_s' + V_o')t_2 \qquad (10)$$

where,
$\tau$ = one half the period of the square waveform $V_s'$
$\tau = T_1 + t_2$ Expression (10) represents the premise that the voltage-second quantity by which the source voltage exceeds the load voltage is absorbed by the current limiter (and choke coil 36') and this absorbed voltage-second quantity is given back during the time interval $t_2$. Rearranging expression (10) and eliminating $t_2$, one has $$t_1 = \frac{\tau}{2}\left(1 - \frac{V_o'}{V_s'}\right). \qquad (11)$$

During time $t_2$, the current and voltage waveforms are in phase and transistors 66a and 66d of FIG. 5A are conducting current through the primary coil 47' of transformer 46'. However, during time $t_1$, the voltage and current waveforms are out of phase and diodes 72a and 72d are conducting current to the filter capacitor $C_1'$ of first interfacing means 21', e.g., current is being returned to the source. Curves E and F are shown displaced by an amount ($\tau/4$) which represents the phase difference for the case where the $V_s' = 2V_o'$. Curve H illustrates the transistor current which during time $t_2$ goes from the terminals A and B (essentially the source) through transistors 66a–66d (and 76a–76d) and into primary 47' of transformer 46'. Likewise curve I illustrates the return current induced from the current limiter and choke 36' during time $t_1$ which passes through the diodes, primary 47' and back into terminals A and B (to capacitor $C_1'$).

Curve J of FIG. 6 represents the voltage across the limiter coils 32" and 33" representing the difference between $V_s'$ (curve E) and $V_o'$ (curve G). In a sense, the inverter or switching means 22' in combination with the current limiting means 29' acts as a pulse width modulated power source wherein the minimum time $t_1$ in which power is returned to the source is zero ($V_s' = V_o'$) and the maximum time $t_1$ is ($\tau/2$) ($V_s' >> V_o'$). In all events, a constant current source $I_s'$ is provided, which upon rectification provides a constant DC current to a load.

In the disclosed power supply, short-circuit protection is inherently provided by virtue of the current limitation of the circuit. Thus, regardless of the load resistance value, or of accidental shorts, output current is limited to a predetermined value $I_L$. No damage results from drastic load variations.

Although the invention is described and illustrated herein by specific embodiments thereof, it is recognized that numerous variations and modifications may be devised by those skilled in the art without departing from the spirit and scope of the teachings hereof. It is intended that the claims to the invention be interpreted to cover such equivalents and variations.

I claim:

1. A power conversion system for use with an AC source for producing a constant current to a load comprising:
   rectifying means connected to said AC source for producing rectified, DC voltages,
   transformer means having a primary winding connected to receive said rectified, DC voltage and a secondary winding for providing approximately constant volt-second AC voltages,
   switching means connected to said transformer primary winding for directing first and second oppositely directed currents through said transformer primary winding,
   trigger means for sequentially triggering and switching means at a rate approximately proportional to the magnitude of said rectified, DC voltages,
   current limiting means connected to receive said approximately constant volt-second AC voltages from said transformer secondary winding for limiting current passing therethrough, and
   means for connecting said current limiting means to a load;
   wherein said current limiting means comprises first and second series connected and oppositely poled windings, respectively wound on first and second saturable cores; and
   wherein said current limiting means comprises a plurality of said pairs of first and second oppositely poled windings connected in parallel to provide a plurality of constant output currents to a plurality of loads.

2. A high efficiency power conversion system capable of use with AC line sources having a wide range of line voltage levels and providing a constant current to a load comprising:
   rectifying means adapted for connection to an AC line source for producing rectified but unregulated DC voltage of a magnitude corresponding to said line voltage level,
   transformer means having primary and secondary windings,
   switching means connected to said transformer primary winding for converting said DC voltage into an approximately constant volt-second AC voltage signal having an approximately constant full duty cycle but with a variable magnitude corresponding to said DC voltage magnitude,
   trigger means for sequentially triggering said switching means at a variable frequency increasing in proportion to an increase in said DC voltage magnitude, but at a higher frequency than said AC line source,
   current limiting means connected to receive said approximately constant volt-second and full duty cycle AC voltage signal from said transformer secondary windings, for limiting the current passing therethrough, and
   means for connecting said current limiting means to a load;
   wherein said current limiting means comprises first and second series connected windings, respectively wound on first and second saturable magnetic cores, and current control winding means thereon, to provide a controllable square wave current limiter; and
   wherein there are a plurality of said current limiting means connected in parallel to provide a plurality of constant output currents to a plurality of loads, individually controllable by said current control winding means.

3. A high efficiency power conversion system capable of use with AC line sources having a wide range of line voltage levels and providing a regulated current to a load comprising:
   waveform generator means adapted for connection to said AC line source for converting said AC line source into an approximately constant volt-second AC signal having an approximately constant full duty cycle, a variable magnitude corresponding to said AC line voltage, and a variable frequency corresponding to said AC line voltage, but a higher frequency than said AC line source;
   current limiting means connected to receive said variable magnitude and variable frequency but approximately constant volt-second and full duty cycle AC signal from said waveform generator means for limiting the current passing through said current limiting means; and
   connecting means for connecting said current limiting means between said waveform generator means and a load,
   wherein said current limiting means comprises first and second series connected windings, respectively wound on first and second saturable magnetic cores, and current control winding means thereon, to provide a controllable current limiter for controlling the current from said waveform generator means to the load.

4. The power conversion system of claim 3, wherein said AC signal from said waveform generator means has a symmetrical square waveform and said current limiting means comprises a square wave current limiter.

5. The power conversion system of claim 3, wherein said current limiting means includes means for providing a presettable DC control current for passage through said current control winding means for changing the magnetic saturation level of said cores.

6. The power conversion system of claim 3, wherein there are a plurality of said current limiting means connected in parallel to provide a plurality of constant output currents to a plurality of loads, individually controllable by individual said current control winding means.

7. The power conversion system of claim 3, wherein the load is a xerographic fusing roller, and wherein said connecting means includes an inductive coil in series with said current limiting means and inductively coupled to said fusing roller to heat said roller.

8. The power conversion system of claim 3, wherein said connecting means includes rectifying means providing a DC output to a load.

9. The power conversion system of claim 3, wherein said waveform generator means comprises:
   rectifying means adapted for connection to an AC line source for producing rectified but unregulated Dc voltage of a magnitude corresponding to said line voltage level,
   transformer means having primary and secondary windings, said secondary winding being connected to said current limiting means,
   switching means connected to said primary winding for converting said unregulated DC voltage into said approximately constant volt-second AC signal having an approximately constant full duty cycle with a variable magnitude corresponding to said DC voltage magnitude, and trigger means for sequentially triggering said switching means at a variable frequency increasing in proportion to an increase in the magnitude of said AC signal.

10. The power conversion system of claim 9, wherein said AC signal from said waveform generator means has a symmetrical square waveform and said current limiting means comprises a square wave current limiter.

11. The power conversion system of claim 10, wherein there are a plurality of said current limiting means connected in parallel to provide a plurality of constant output currents to a plurality of loads, individually controllable by individual said current control winding means.

* * * * *